US007414198B2

(12) United States Patent
Stansbie et al.

(10) Patent No.: US 7,414,198 B2
(45) Date of Patent: Aug. 19, 2008

(54) GROUNDING DEVICE WITH PLASTIC HOUSING

(75) Inventors: Michael Stansbie, Wedemark (DE); Thomas Martin, Wiggensbach (DE); Peter Niederfofer, Lauben (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/566,212

(22) Filed: Dec. 2, 2006

(65) Prior Publication Data

US 2007/0137877 A1 Jun. 21, 2007

(30) Foreign Application Priority Data

Dec. 19, 2005 (EP) ................................. 05292757

(51) Int. Cl.
*H02G 15/02* (2006.01)

(52) U.S. Cl. ...................................... 174/74 R; 174/78

(58) Field of Classification Search ............... 174/74 R, 174/78, 75 C, 84 R, 88 R
See application file for complete search history.

(56) References Cited

U.S. PATENT DOCUMENTS 2,338,659 A * 1/1944 Morehouse ................ 248/74.3
2,387,295 A * 10/1945 Robertson .................. 248/74.3
2,416,063 A * 2/1947 Nicholls ................. 174/40 CC
2,973,762 A * 3/1961 Koenig ........................ 607/109
5,230,537 A * 7/1993 Newman .................... 285/112
6,297,447 B1 * 10/2001 Burnett et al. .......... 174/40 CC
6,441,303 B1 * 8/2002 Daume ........................ 174/51
6,548,762 B2 * 4/2003 Jiles et al. ...................... 174/78
2001/0011600 A1 * 8/2001 Daume ........................ 174/78
2002/0112874 A1 * 8/2002 Jiles et al. ...................... 174/78
2005/0048815 A1 3/2005 Daume

FOREIGN PATENT DOCUMENTS

EP 0744788 B1 5/1996
EP 1389807 A 2/2004
GB 584845 A 1/1947
WO 0008369 A 2/2000

* cited by examiner

*Primary Examiner*—William H Mayo, III
(74) *Attorney, Agent, or Firm*—Sughrue Mion, PLLC

(57) ABSTRACT

A grounding device including a plastic body, the plastic body including a base internal structure made of a soft elastic material, the soft elastic material including a thermoplastic elastomer having a plastic hardness within the Shore Hardness scale A range, and the base internal structure being coupled to and covered by an external structure made of a plastic material having a greater plastic hardness.

12 Claims, 3 Drawing Sheets

GROUNDING DEVICE WITH PLASTIC HOUSING

BACKGROUND OF THE INVENTION

The invention is based on a priority application EP 05292757.1 which is hereby incorporated by reference.

The present invention relates to a grounding device for earthing cylindrical or elliptical metal structures such as coaxial cables, pipes, tubes or waveguides.

A grounding device is often attached to a cable to place the cable at zero potential with the earth, which minimizes the potential damage that may occur when the cable is subjected to extreme current conditions, such as lightning. The grounding device is a conducting connection, usually with a grounding wire directly or indirectly connected to the ground, which diverts electric currents to the ground to prevent damage to the cable or related equipment. Generally the grounding device is attached to a metal section of a pipe or tubular waveguide or to an exposed metal section of a conductor (having a portion of its outer jacket removed).

EP 0 744 788 discloses a device of the above kind for connecting a metallic pipe to earth potential. US 2005/0048815, which is considered the closest state of the art, discloses a grounding clamp comprising a base structure made of thermoplastic material which is joined to a support element by casting or injection molding.

SUMMARY OF THE INVENTION

It is the object of the present invention to provide a grounding device with a plastic housing structure with improved performance.

The object is achieved by a grounding device with plastic housing comprising a base internal structure made of a soft elastic material, such as a thermoplastic elastomer having a plastic hardness within the Shore Hardness scale A range, characterized in that said base internal plastic structure is coupled to and covered by an external structure made of a plastic material having a greater plastic hardness and a method for manufacturing a grounding device, comprising

- connecting a contact element, made of a sheet of metal matching in form the surface of a metal body to be grounded, to a grounding wire conductor,
- molding an internal structure made of a soft elastic material having a plastic hardness within the Shore Hardness scale A range,
- molding an external base structure made of a plastic having a plastic hardness greater than the internal plastic structure, and
- coupling the internal and external plastic structure.

One important feature of the grounding device according to the invention is that the plastic housing, for fixing the grounded contact element to the cable's outer conductor, comprises an external base structure made of a "hard" plastic, such as a polyamide, coupled to an internal structure made of a "soft" plastic, such as a thermoplastic elastomer. The internal soft plastic structure is designed to provide appropriate sealing for the grounding electrical connection and compression for the connector element to the cable, and the external hard plastic structure is designed to provide mechanical protection and mechanical compression for the internal plastic structure. Further, the base hard plastic external structure and the soft plastic internal structure may have a contact surface which perfectly adapts to each other so that when mechanically coupled the sealing effect is improved.

It is seen advantageous that the grounding device according to the invention is easy to manufacture and install. The plastic housing can be manufactured by injection molding and a contact element with connection to a grounding wire conductor may be embedded in said housing or installed in a later step.

Further advantageous configurations of the invention emerge from the dependent claims, the following description and the drawings. For example, another important feature is that the soft plastic internal structure may comprise two mutually spaced sealing lips segments and a bed of knops. The sealing lips segments provide effective sealing of the grounding electrical connection from dust and moisture and the bed of knops provide effective and equally distributed compression to the cable's outer conductor and to the grounded metal contact element to improve the electrical grounding connection. Further, the sealing and compressing functionality may be implemented in different segments of the soft plastic structure so that they do not influence the properties of each other.

Still another important feature is that the grounding device comprises a contact element made of a sheet of metal which matches in form the surface of the metal body to be grounded and which can be easily welded to a grounding wire conductor. To provide long term good grounding properties the contact element needs to have a high specific conductivity and a low contact resistance to the cable's outer conductor. Known grounding device constructions use either metal alloys that provide a certain spring effect resulting in a good contact pressure but reduced conductivity or a highly conductive metal with limited contact pressure. The here described invention allows both, the use of highly conductive materials for the contact element, such as copper, and the use of a long term high contact pressure by the bed of knops pressing the contact element onto the cable's outer conductor.

Still another important feature is that the outer surface of the external hard plastic structure may be adapted for the reception of locks and the ease of use of installation tools. The outer surface may comprise longitudinal ribs into which the lock is snapped in and additionally are adapted in order to be used with a pliers so that the two external structure hard components can be hold together, overcoming the force executed by the internal soft plastic component.

BRIEF DESCRIPTION OF THE DRAWINGS

An embodiment example of the invention is now explained with the aid of FIGS. 1 to 5.

DETAILED DESCRIPTION OF THE INVENTION

Figure 1:
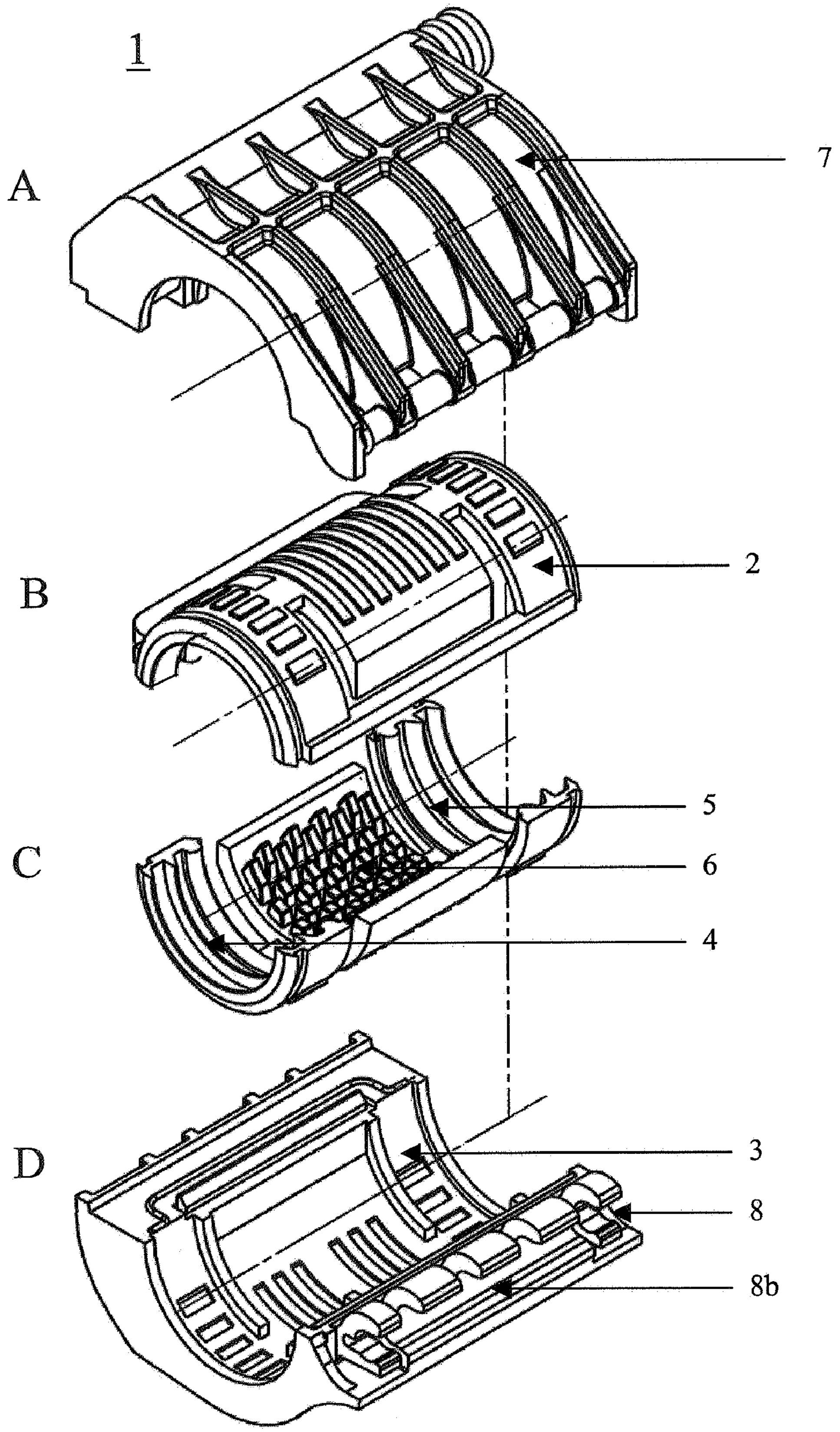
FIG. 1 shows a perspective view of exemplary grounding device plastic housing components according to the invention.

FIG. 1 shows a perspective view of an exemplary grounding device plastic housing 1 comprising external base structure components A, D and internal structure components B, C according to the invention.

The external base structure components A, D are made of a "hard" plastic material and the internal structure components B, C are made of a "soft" plastic material. "Hard" and "soft" plastic is to be understood according to known standardized methods for measuring the resistance of a test plastic material toward indentation, thereby providing and empirical "hardness" value. For example, a known preferred hardness testing method for elastomers and soft plastics such as polyolefins, fluoropolymers and vynils, is the "Shore Hardness" test. The "Shore Hardness" value of a plastic material sample is determined by the penetration of a Durometer indenter foot into that sample. There are several Shore Hardness scales e.g. a Shore A scale and a Shore D scale according to DIN 53505 norm. On the other hand, a known preferred hardness testing method for harder plastics such as polyamide, polycarbonate and polystyrene, is the "Ball Indentation Hardness" test according to ISO 2039-1 norm. The "Ball Hardness" value of a plastic material sample is expressed in MPa units (the load in Newtons divided by the surface area of the indentation in mm). There are several Ball Hardness scales e.g. H132/30 and H358/30 depending on the load in Newtons applied.

According to the invention, the soft plastic material of the internal structure B, C has a plastic hardness within the Shore Hardness scale A range, and preferably a Shore Hardness value lower than 35 at said Shore A and the hard plastic material of the external base structure A, D has a plastic hardness greater than the internal plastic structure, preferably having Ball Hardness value of at least 40-310 at H 358/30 scale. An example of the soft plastic material used may be a thermoplastic elastomer and the hard plastic material used a polyamide such as PA66.

The soft plastic internal structure B, C has a profiled outer contact surface 2 which matches the inner surface 3 of the hard plastic external base structure A, D. This improves the sealing effect when both structures are coupled to each other. The soft plastic internal structure B, C also comprises two mutually spaced sealing lips segments 4 and 5 and a bed of knops 6 in between. The sealing lips segments 4 and 5 provide effective sealing of the grounding electrical connection from dust and moisture. The bed of knops 6 provide effective and equally distributed compression to the cable's outer conductor and to the grounded metal contact element to improve the electrical grounding connection. Because the sealing and compressing functionality are implemented in different segments of the soft plastic structure B, C they do not influence the properties of each other.

The hard plastic external base structure A, D has an outer surface 7 adapted for the use of fixing elements such as clamps or locks which maintain the housing structure 1 fastened in a assembled position around a cable (not shown). The hard plastic external base structure outer surface 7 is also adapted for the use of installing tools such as pliers, so that installation is easy to perform. Additionally, in order to mechanically couple the two hard plastic components A, D some claw-like elements 8 and **8*b* may be used, in particular, the two external claws 8 in FIG. 1**D hold together the two hard plastic components while the middle claws are used for pivot or guidance.

Figure 2:
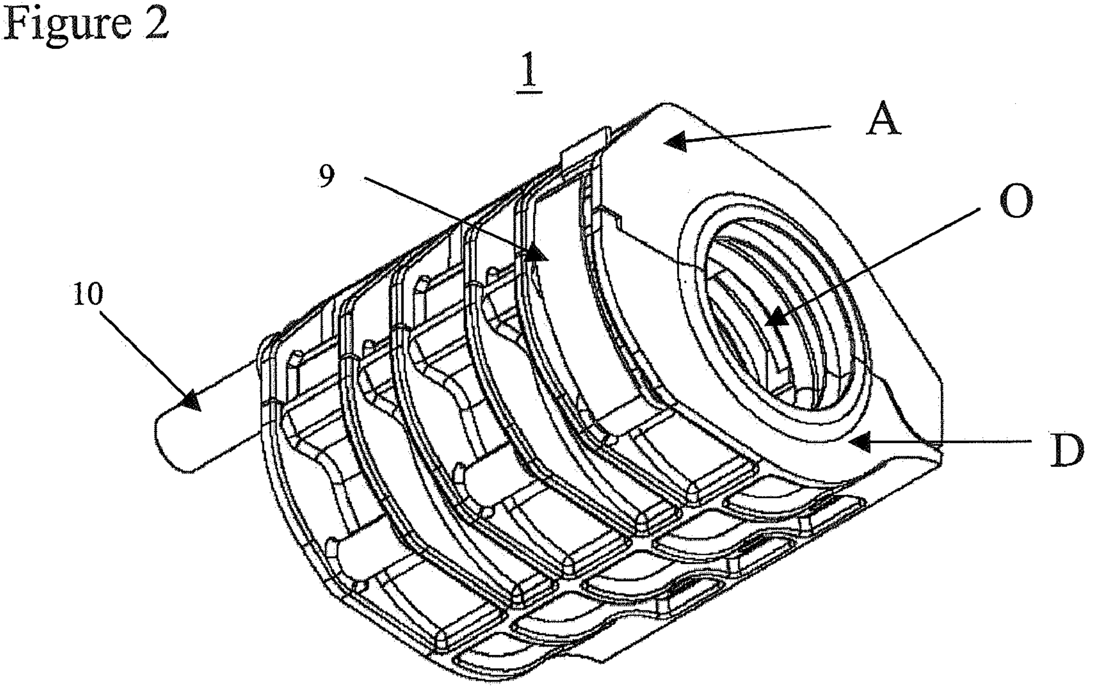
FIG. 2 shows a first perspective view of a grounding device according to the invention in its assembled state.

FIG. 2 shows a perspective view of a grounding device according to the invention in its assembled state, with the plastic housing 1 external structure components A, D mechanically coupled and fastened by means of a lock 9. The opening O is the space intended for the cable (not shown) to be grounded by means of an internal contact element (not shown) connected to a conductor of a grounding wire 10.

Figure 3:
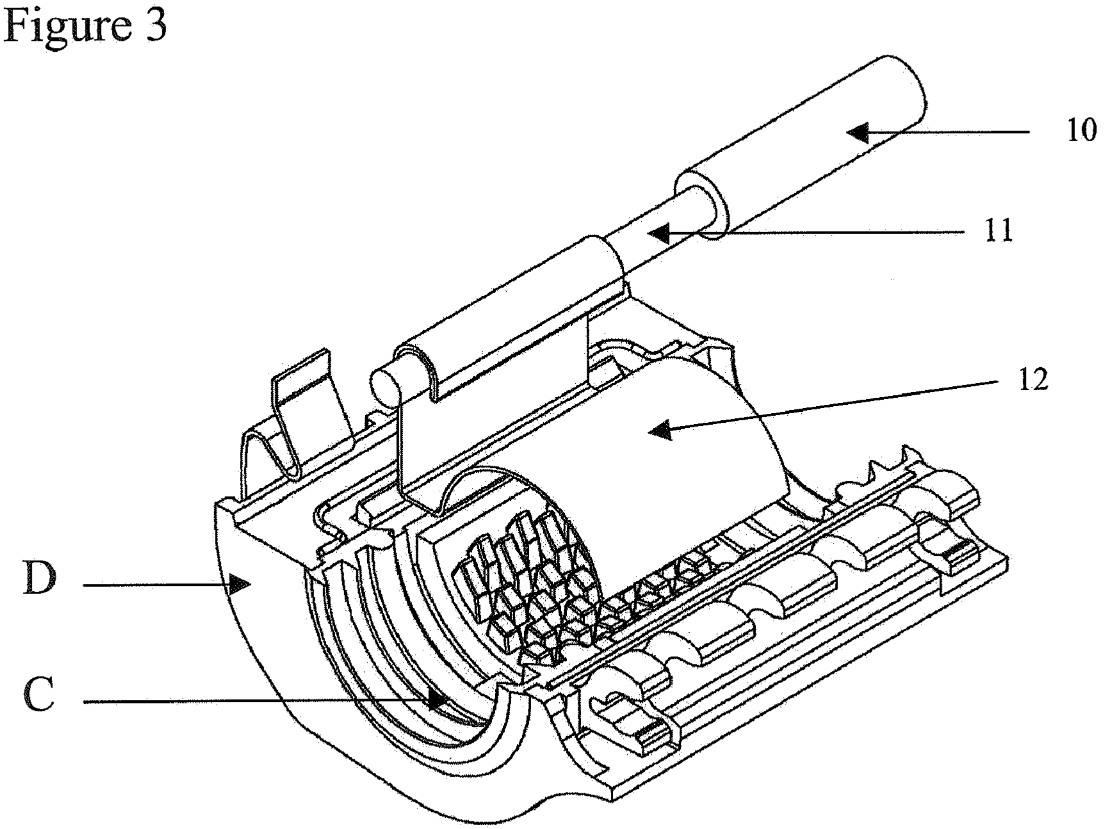
FIG. 3 shows a perspective view of the grounding device plastic housing bottom part and a contact element connected to a grounding wire conductor.

FIG. 3 shows a perspective view of the grounding device plastic housing bottom part comprising an external hard plastic component D coupled to an internal soft plastic component C and a grounding contact element 12 connected to a grounding wire conductor 11.

The contact element 12 may be made of a sheet of metal such as copper which matches in form the surface of the metal body e.g. the outer conductor of a cable to be grounded and may be easily welded to a grounded conductor 11. Usually the grounded conductor 11 has a protective outer jacket.

When manufacturing the grounding device according to the invention, the contact element 12 connected to the grounding wire conductor 11 is embedded into the grounding device plastic housing 1, when molding the plastic, so that it remains fixed to the top part of the plastic housing. Alternatively, it is also possible that the contact element 12 connected to the grounding wire conductor 11 is not embedded in the grounding device plastic housing 1 during the molding process, but may be manually installed inside the grounding device plastic housing 1 in a later step.

Figure 4:
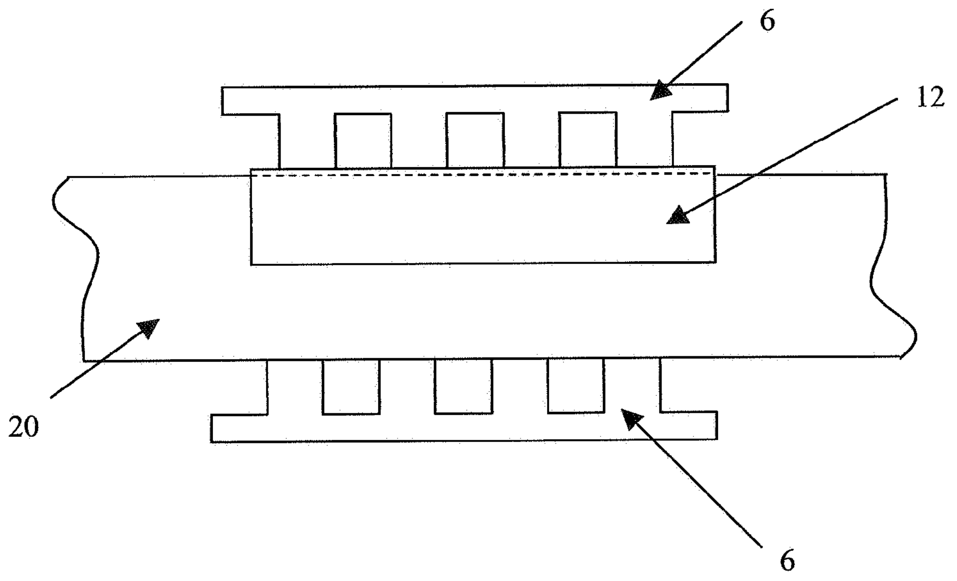
FIG. 4 is a schematic side view of a grounding electrical connection according to the invention.

FIG. 4 schematically shows how the grounding connection is done inside the grounding device. The contact element 12 and the cable outer conductor 20 are compressed by a bed of knops 6 of the bottom and top internal soft plastic structure B and C.

Figure 5:
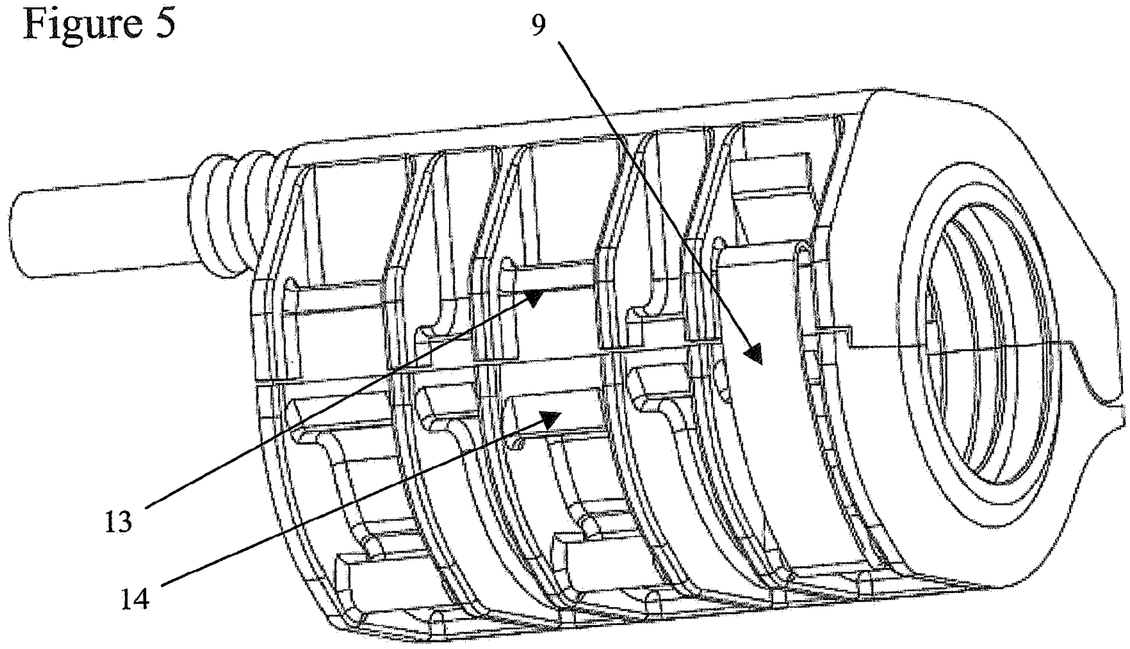
FIG. 5 shows a second perspective view of a grounding device according to the invention in its assembled state.

In FIG. 5 it is shown how the outer surface of the external hard plastic structure is adapted for the reception of locks 9 and the ease of use of installation tools. The outer surface comprises longitudinal ribs 13, 14 into which the lock is snapped in and additionally are adapted in order to be used with a pliers so that the two external structure hard components can be hold together, overcoming the force executed by the internal soft plastic component.

This construction is a benefit for installation at critical working position and/or where hand force is not enough for closing the grounding kit housing at lower (minus) temperatures. Both ribs are so designed that a slip off the pliers is avoided.

For the sake of generalization, although the examples of the invention have been directed to a grounding device with plastic components of a specific implementation form it has to be understood that the plastic components may have other surface profiles still contained within the spirit of the invention.

The invention claimed is:

1. A grounding device comprising a plastic body and a contact element, said plastic body comprising a base internal structure comprising a soft elastic material, said soft elastic material comprising a thermoplastic elastomer having a plastic hardness within the Shore Hardness scale A range, wherein said base internal structure is coupled to and covered by an external structure comprising a plastic material having a greater plastic hardness; and said contact element being embedded into the plastic housing and connecting to a grounding wire conductor.

2. The grounding device of claim 1 wherein the base internal structure comprises a plastic with a Shore Hardness less than 35 at Shore A scale and the external structure comprises a plastic comprising a polyamide with a Ball Hardness of at least 40-310 MPa at H358/30 scale.

3. The grounding device of claim 1 wherein the base internal structure comprises a profiled outer surface which matches an inner surface of the external structure for coupling purposes.

4. The grounding device of claim 1 wherein the base internal structure comprises an inner surface with two mutually spaced sealing lips segments and a bed of knops in between.

5. The grounding device of claim 1 wherein the external structure comprises an outer surface adapted for the use of fixing elements which maintain the plastic body fastened in an assembled state around a cable.

6. The grounding device of claim 5, the external structure further comprising at least one claw-like element for mechanical coupling and/or for pivot or guidance of said external structure.

7. The grounding device of claim 1 wherein the contact element comprises a sheet of metal which matches in form the surface of a metal body to be grounded.

8. The grounding device of claim 7 wherein the contact element and a cable's outer conductor are pressed for making an electrical contact.

9. The grounding device of claim 1, wherein the contact element is disposed on the interior surface of said base internal structure.

10. Method for manufacturing a grounding device, the method comprising connecting a contact element, comprising a sheet of metal matching in form the surface of a metal body to be grounded, to a grounding wire conductor, molding an internal structure comprising a soft elastic material having a plastic hardness within the Shore Hardness scale A range, molding an external structure comprising a plastic having a plastic hardness greater than the internal structure, and coupling the internal and external structure;

said contact element being embedded into the plastic housing and connecting to a grounding wire conductor.

11. The method for manufacturing of claim 10 wherein the contact element connected to the grounding wire conductor is embedded in the internal and external structure when molding the plastic or is manually installed in a later step.

12. The method for manufacturing of claim 10, wherein the contact element is disposed on the interior surface of said base internal structure.

* * * * *